United States Patent [19]

Smith

[11] 4,053,667

[45] Oct. 11, 1977

[54] STIFFENED STRUCTURAL LAMINATE AND METHOD OF MOLDING LAMINATE WITH STIFFENER BEADS

[75] Inventor: Bruce W. Smith, Nipomo, Calif.

[73] Assignee: Lockheed Aircraft Corporation, Burbank, Calif.

[21] Appl. No.: 504,441

[22] Filed: Sept. 9, 1974

[51] Int. Cl.² .............................................. B32B 3/12
[52] U.S. Cl. .................................. 428/36; 138/144; 138/148; 138/172; 156/245; 156/285; 428/73; 428/116
[58] Field of Search .................. 161/68, 69; 52/615, 52/618, 144; 29/455 LM; 138/148, 172; 156/143, 144, 195, 197, 245, 285, 292, 382, 172, 212; 220/71, 72; 264/90, 94, 220; 428/35, 36, 73, 116, 117, 118

[56] References Cited

U.S. PATENT DOCUMENTS

| | | | |
|---|---|---|---|
| 2,477,852 | 8/1949 | Bacon | 161/68 |
| 2,720,948 | 10/1955 | Pajak | 428/116 X |
| 2,728,479 | 12/1955 | Wheeler | 161/68 X |
| 2,793,718 | 5/1957 | Pajak | 161/68 |
| 2,839,442 | 6/1958 | Whitaker | 428/73 X |
| 2,870,857 | 1/1959 | Goldstein | 181/33 |
| 3,013,584 | 12/1961 | Reed et al. | 156/197 X |
| 3,079,876 | 3/1963 | Doane | 428/118 X |
| 3,097,982 | 7/1963 | Stoner | 161/68 X |
| 3,150,030 | 9/1964 | Mondano | 161/68 |
| 3,335,903 | 8/1967 | Anderson | 220/72 X |
| 3,438,839 | 4/1969 | Williams et al. | 156/171 X |
| 3,450,593 | 6/1969 | Fossier et al. | 428/73 |
| 3,490,973 | 1/1970 | Graff et al. | 156/292 X |
| 3,553,054 | 1/1971 | Maus | 156/382 |
| 3,661,294 | 5/1972 | Pearson et al. | 220/72 X |
| 3,700,522 | 10/1972 | Wonderly | 161/68 X |
| 3,703,422 | 11/1972 | Yoshino | 156/87 |
| 3,815,215 | 6/1974 | Medawar | 161/68 X |
| 3,925,132 | 12/1975 | Bartlow et al. | 428/36 X |

*Primary Examiner*—George F. Lesmes
*Assistant Examiner*—H. F. Epstein
*Attorney, Agent, or Firm*—Billy G. Corber; Lowell G. Turner

[57] ABSTRACT

A novel stiffened structural laminate formed by contacting at least one layer of a curable resin-impregnated fabric with at least one strip of cellular honeycomb core, disposing another piece of said curable resin-impregnated fabric over said strip of core, and curing said resin under laminating conditions to bond said honeycomb core to said fabric and produce a unitary laminate which includes said strip as a stiffening bead.

6 Claims, 11 Drawing Figures

STIFFENED STRUCTURAL LAMINATE AND METHOD OF MOLDING LAMINATE WITH STIFFENER BEADS

BACKGROUND OF THE INVENTION

The present invention pertains to novel structural laminates and their production.

Various structural laminates have been proposed and used. In the past, stiffened laminates have been made by first forming a primary laminate consisting of several layers of resin impregnated fabric. The primary laminate was cured or completed and then a stiffening rib or bead, usually of honeycomb core, was applied or attached to the primary laminate with glue or adhesive, which attachment involved scuffing the surface of the primary laminate with a grinder so that the adhesive could bond, and then locating and holding the stiffener rib in the proper place until the adhesive cured. The present invention eliminates the aforementioned multiplicity of steps in a surprisingly simple manner, and eliminates the need for grinding and the use of the adhesive altogether.

Another disadvantage or prior laminates is their relatively great weight, as compared with a reinforced laminate constructed in accordance with the teachings of the present invention.

The gist of the present invention is a new structural laminate and method of forming same, preferably using honeycomb core with single cover sheets for the primary structure together with honeycomb core reinforcement strips, with the core or cores preferably being crushed during the step of lamination, and with the primary laminate structure and the reinforcement being formed and bonded in one operation. More particularly, this invention is directed to the concept of mold-forming stiffener honeycomb core beads to a primary structure laminate simultaneously with the molding of the primary structure formed of a reinforced fiber plastic. It is believed that this invention represents a major advance in a crowded art, which will result in its widespread adoption . . . particularly in the aircraft industry.

BRIEF SUMMARY OF THE INVENTION

Briefly, the present invention comprises a novel stiffened unitary laminate formed by contacting at least one layer of a curable resin-impregnated fabric with at least one strip of cellular honeycomb core, disposing another piece of said curable resin-impregnated fabric over said strip of core, and curing said resin under laminating conditions to bond said honeycomb core to said fabric and to produce a unitary laminate which includes said strip as a stiffening bead.

This invention preferably involves the crushing of the honeycomb core during lamination. This has been found to significantly improve the bonding of the resin-impregnated fabric to the honeycomb core.

This invention also comprehends the method of making the stiffened laminate by the arrangement of the curable resin-impregnated fabric and the honeycomb core material as aforesaid, and the lamination of the same by curing of the resin in a match mold or vacuum bag.

It is a primary object of the present invention to provide a novel, structural laminate for use in locations where high strength and light weight are desired. More particularly, it is an object to provide a novel structural laminate which has reinforcing incorporated therein concurrently with the production of the primary laminate structure.

It is also an object of the present invention to provide a novel structural laminate having a crushed honeycomb core.

A further object is to provide novel structural laminates in various shapes and configurations, including reinforced aircraft window reveal panels, reinforced tubular conduit for conducting heated or cooled air to various parts of an aircraft, bulkheads for vessels, and the like.

In another aspect, it is an object of the invention to provide a new method of forming a reinforced structural laminate.

These and other objects and advantages of the present invention will be apparent from the following more detailed description and the accompanying drawings.

DESCRIPTION OF THE PREFERRED EMBODIMENTS

Figure 1:
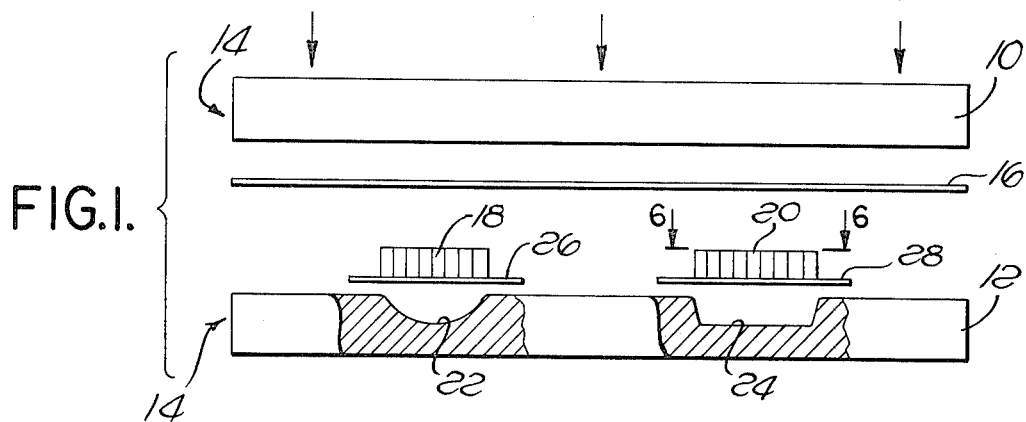
FIG. 1 is an exploded view, partially in section, illustrating the first step in producing a panel-type, structural laminate in accordance with the teachings of the present invention, embodying a single-ply panel and using a match mold.
Figure 2:
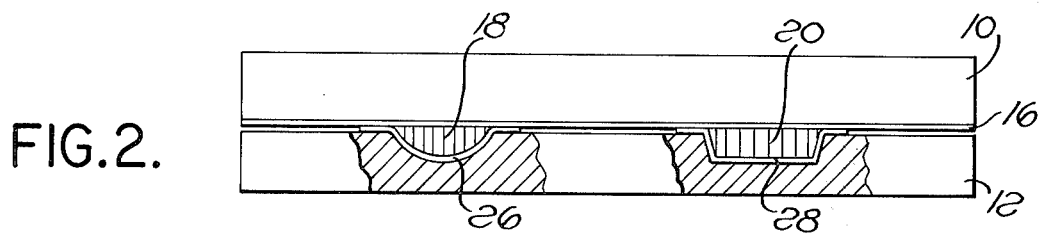
FIG. 2 shows a subsequent step in the practice of the invention using a match mold.
Figure 4:
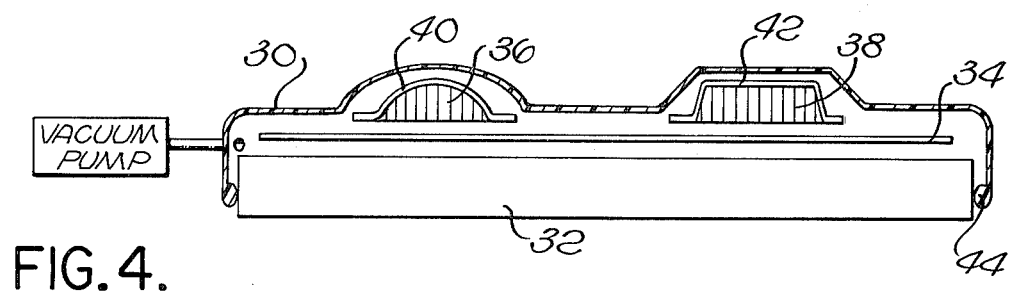
FIG. 4 is a view similar to FIG. 1, illustrating the first step in producing a like panel-type laminate, but employing a vacuum-bag technique.
Figure 7:
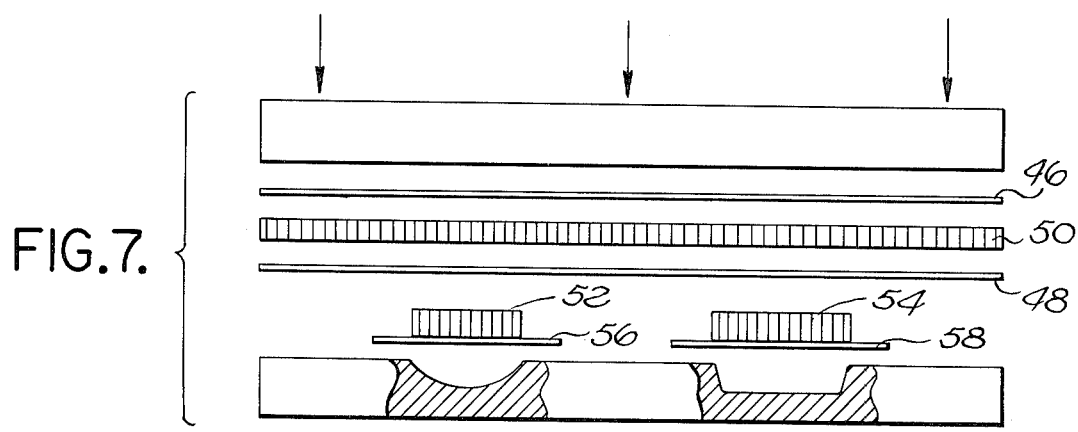
FIG. 7 is a view similar to FIG. 1, showing the first step in producing a structural laminate in accordance with the teachings of the present invention, using a match mold, and wherein the primary laminate contains a honeycomb core.
Figure 9:
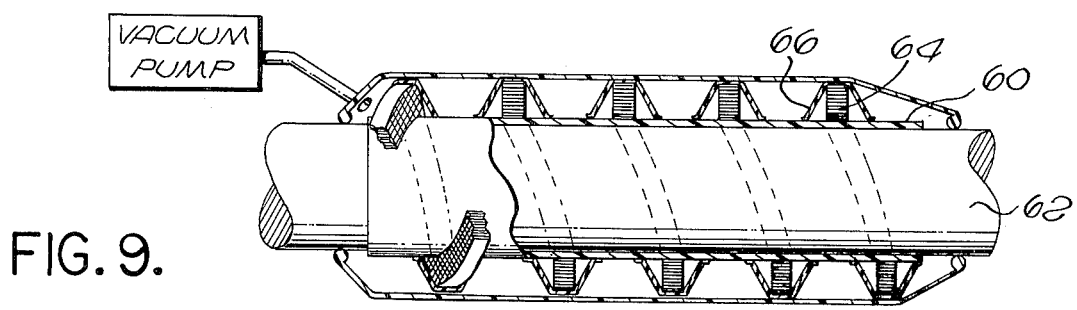
FIG. 9 is a side elevational view, partially in section, illustrating the method of forming a tubular reinforced structural laminate in accordance with the teachings of the present invention, using the vacuum bag technique.

In one embodiment, the novel structural laminate can be made in a match mold as shown in FIGS. 1, 2 and 7. Alternatively, the structural laminate can be made using the vacuum bag technique as shown in FIGS. 4 and 9.

The paper or aluminum honeycomb core for the primary structure and the reinforcing bead can be partially pre-crushed or crushed at the time of the molding operation. In any case, the presence of crushed core in the finished product is preferred to a non-crushed core in order to improve the bonding of the core to the resin-impregnated skins. Stated somewhat differently, I have learned that the uneven thickness of uncrushed core causes voids in the bonding of the core to the skin or skins.

Considering the drawings in greater detail, particularly FIGS. 1 and 2, in one embodiment, the upper and lower halves 10 and 12, respectively, of a match mold 14 receive a single layer 16 of curable resin-impregnated fabric. Honeycomb core stiffener ribs 18 and 20 are precut and disposed in recesses 22 and 24, respectively, provided in the lower mold half 12, on top of strips 26 and 28 of curable resin-impregnated fabric. The recesses 22 and 24 are shaped to produce the desired cross-section in the stiffener ribs, and the strips 26 and 28 are of sufficient width to enclose the ribs 18 and 20 and provide side edges to bond with the primary structure.

Figure 3:
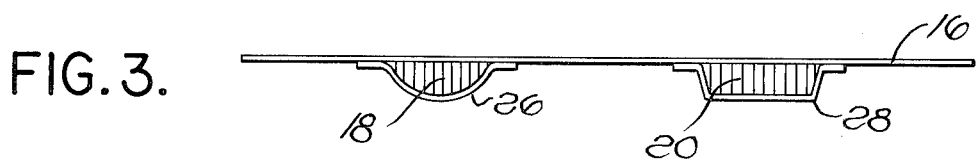
FIG. 3 shows the completed structural single-ply laminate resulting from the practice illustrated in FIGS. 1 and 2.

The mold is closed and heat and pressure applied to crush the core ribs 18 and 20 and harden the resin, resulting in the final integral rigid structural laminate shown in FIG. 3.

Figure 5:
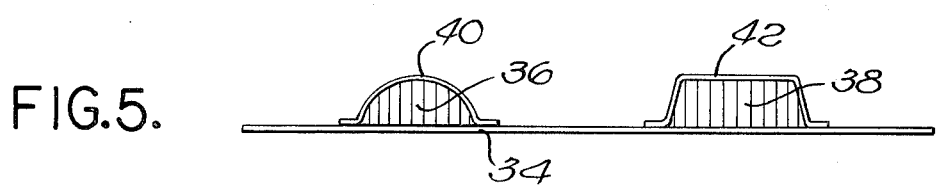
FIG. 5 shows the structural laminate produced by the practice illustrated in FIG. 4.
Figure 6:
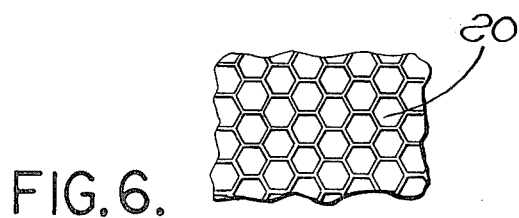
FIG. 6 is a top plan view of a portion of the honeycomb core used in the reinforcing beads and also in the primary structure laminate in one embodiment of the present invention.

The same general result can be achieved using a flexible plastic vacuum bag 30 as shown in FIGS. 4 and 5. Thus, on a platen 32 there are placed a layer 34 of curable resin-impregnated fabric, precut ribs 36 and 38 of reinforcing core, and strips 40 and 42 of curable resin-impregnated fabric. In this embodiment, it is desirable to pre-shape the ribs 36 and 38 to achieve the desired cross-sectional configuration.

A vacuum bag 30 and sealing gasket 44 are then installed and vacuum produced by a vacuum pump to cause the vacuum bag to pull down, snuggly pressing the core strips and fabric against the platen. The platen 32 is normally heated to cure the resin.

One obvious advantage of using a vacuum bag is that it avoids the cost of an expensive mold. On the other hand, more care must be taken in placing the ribs on the sheet of fabric, because they will be bonded in the same location in which they are placed.

Figure 8:
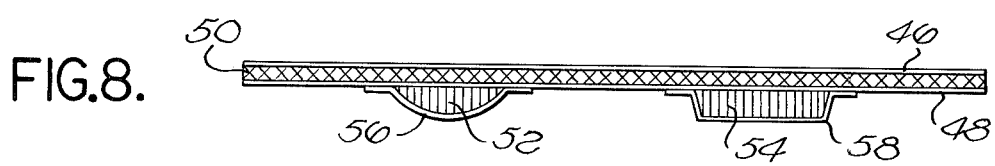
FIG. 8 shows the structural laminate produced by the practice illustrated in FIG. 7.

FIGS. 7 and 8 show an embodiment similar to FIGS. 1 through 3, except that two layers 46 and 48 of resin-impregnated fabric are used with a layer 50 of honeycomb core in the primary structure. Similar honeycomb ribs 52 and 54 and fabric strips 56 and 58 are used as previously described in a simultaneous lamination process to yield a final stiffened structural laminate shown in FIG. 8.

A similar type of laminate with a primary structure containing two layers of pre-impregnated fabric and a honeycomb core can also be formed utilizing the vacuum bag technique shown in FIG. 4.

Figures 10, 11:
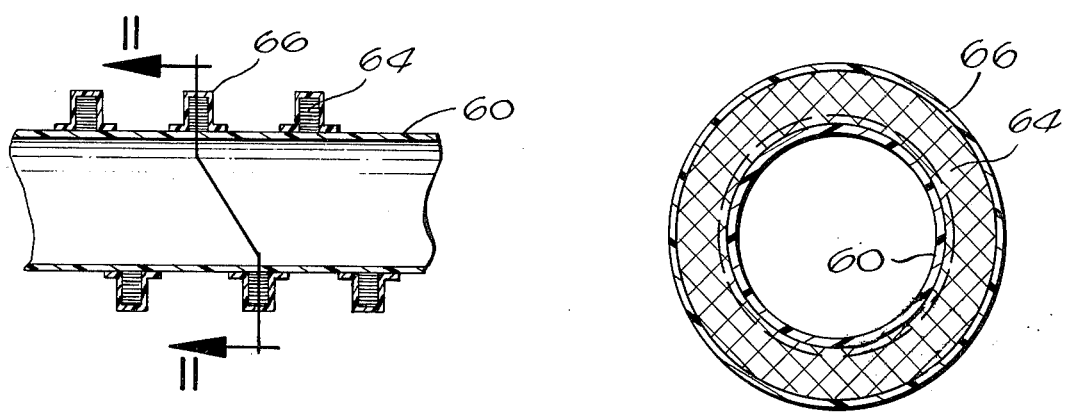
FIG. 10 is a longitudinal section view of a tubular laminate produced by the practice illustrated in FIG. 9.
FIG. 11 is an enlarged, vertical sectional view along the line 11—11 in FIG. 10.

The present invention is also applicable to the production of structural tubular laminates as shown in FIG. 9 through 11. In this embodiment, a layer 60 of curable resin-impregnated fabric is laid over a rigid mandrel 62, with overlapping edges (not shown). A honeycomb rib 64 is then preferably wound in spiral-like fashion over the mandrel, followed by a strip 66 of curable resin-impregnated fabric. If desired, a plurality of spaced-apart annular ribs can be used in place of a spiral wound rib.

Lamination is then carried out in a vacuum bag, as previously described, producing reinforced tubular structural laminate as shown in FIGS. 10 and 11.

The novel stiffened laminates of this invention have numerous and varied applications such as in window reveals for aircraft, bulkheads, boat hulls, and the like.

One of the advantages of a stiffened structural laminate constructed in accordance with the teachings of the present invention, is its relatively high strength/weight ratio. By way of example, a standard four-ply phenolic fiber glass window reveal for a well-known aircraft, weights 1148 grams. On the other hand, a window reveal of equivalent strength produced according to the present invention with epoxy-impregnated fiber glass and an aluminum core, weighed only 830 grams, and one made with phenolic fiber glass and a paper core weighed 785 grams. When one considers the number of windows in a jumbo jet, a saving of 300–350 grams per window is significant.

Another advantage is that stiffened structural laminates of the present invention can be trimmed using the same production tools used with the present four-ply phenolic fiber glass laminates, viz. hand routers and diamond saws, in approximately the same time.

The resin-impregnated fabric used in this invention is, per se, well-known. Preferably, it is a fiber glass or other woven fiber which has been pre-impregnated with a resin which is capable of hardening by further or final curing or staging under the influence of laminating heat and/or pressure. Typical resins are the phenolics, epoxies which are the glucidyl ethers of polyhydric compounds such as aliphatic polyols or phenols, and ethylenically unsaturated polyesters containing a co-polymerizable monomer.

The honeycomb core and ribs can be made of aluminum, of paper, of a nylon fiber treated with phenolic resin which is sold under the trademark NOMEX, or of a high modulus organic polymer fiber which is sold under the trademark PRD-49.

It has been found that the bonding of the resin-impregnated fabric to the honeycomb is substantially improved by partially pre-crushing the core or by applying sufficient force or pressure to the core during lamination to produce crushing of the core. The problem with uncrushed core is that it has a non-uniform thickness, which can result in only incomplete or partial bonding of the resin-impregnated fabric to the honeycomb core.

The honeycomb stiffener or rib can be of any desired cross-section, and is usually of rectangular or arcuate cross-section in conformity with the shape of the match mold. It is to be understood that the honeycomb rib can also be pre-cut to any desired cross section.

Having fully described the invention, it is intended that it be limited only by the lawful scope of the appended claims.

I claim:

1. A rib-stiffened laminate formed by:
   contacting a primary structure of at least one layer of a curable resin-impregnated fabric with at least one strip of cellular honeycomb core;
   disposing another piece of said fabric over said strip of core in engagement with said core and said primary structure to define at least one reinforcing rib upon said primary structure; and
   partially crushing said core and curing said resin under laminating conditions such that said core is bonded to said fabric and said fabric piece is bonded to said primary structure.

2. The rib-stiffened laminate of claim 1 in planar form.

3. The rib-stiffened laminate of claim 1 in tubular form, said rib being a single rib disposed spirally relative to said tubular form, each subsequent revolution thereof being spaced from the last.

4. The stiffening laminate of claim 1 in tubular form wherein a plurality of said ribs are provided, said ribs being annular and spaced apart.

5. The method of forming a rib-stiffened laminate which comprises simultaneously laminating under heat and pressure a primary structure of at least one layer of a curable resin-impregnated fabric with at least one strip of a cellular honeycomb core, another piece of said fabric being disposed over said strip of core in engagement with said primary structure, while partially crushing said cellular honeycomb core during laminating said laminate being cured to define a stiffening rib upon said primary structure.

6. The method of claim 5 wherein said layer is in tubular form and said core and said other piece of fabric are spirally disposed about said layer.

* * * * *